(12) United States Patent
Satoh et al.

(10) Patent No.: US 11,062,701 B2
(45) Date of Patent: Jul. 13, 2021

(54) ANSWERING DEVICE, CONTROL METHOD FOR ANSWERING DEVICE, AND RECORDING MEDIUM

(71) Applicant: SHARP KABUSHIKI KAISHA, Sakai (JP)

(72) Inventors: Shinya Satoh, Sakai (JP); Kazunori Morishita, Sakai (JP); Hiroyasu Igami, Sakai (JP); Naoki Esumi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 78 days.

(21) Appl. No.: 16/469,990

(22) PCT Filed: Aug. 29, 2017

(86) PCT No.: PCT/JP2017/031012
§ 371 (c)(1),
(2) Date: Jun. 14, 2019

(87) PCT Pub. No.: WO2018/123139
PCT Pub. Date: Jul. 5, 2018

(65) Prior Publication Data
US 2020/0090645 A1 Mar. 19, 2020

(30) Foreign Application Priority Data
Dec. 27, 2016 (JP) .............................. JP2016-253889

(51) Int. Cl.
*G10L 15/18* (2013.01)
*G06F 40/253* (2020.01)
(Continued)

(52) U.S. Cl.
CPC ........ *G10L 15/1815* (2013.01); *G06F 40/242* (2020.01); *G06F 40/253* (2020.01);
(Continued)

(58) Field of Classification Search
CPC . G10L 15/1815; G10L 15/1822; G10L 15/22; G10L 15/30; G10L 13/00;
(Continued)

(56) References Cited

U.S. PATENT DOCUMENTS 5,873,055 A * 2/1999 Okunishi ................ G06F 40/55
704/2
6,246,989 B1 * 6/2001 Polcyn .................... G10L 15/22
704/275
(Continued)

FOREIGN PATENT DOCUMENTS

JP 2004-334591 A 11/2004

OTHER PUBLICATIONS

English Translation of Written Opinion of JP 2018558806 (JP WO 2018123139 A1), dated Aug. 6, 2020 (Year: 2020).*
(Continued)

*Primary Examiner* — Eric Yen
(74) *Attorney, Agent, or Firm* — ScienBiziP, P.C.

(57) ABSTRACT

A response sentence that is satisfactory to a user is formed. A response device (1) includes: a related term searching section (13) configured to, in a case where an input sentence contains an unknown word, detect a related term, which is a known word that shares, with the unknown word, at least one shared word; and a response sentence forming section (16) configured to form the response sentence whose content is related to the related term that has been detected by the related term searching section (13).

11 Claims, 8 Drawing Sheets

(51) Int. Cl.

| | |
|---|---|
| *G06F 40/268* | (2020.01) |
| *G06F 40/242* | (2020.01) |
| *G06F 40/30* | (2020.01) |
| *G10L 15/22* | (2006.01) |
| *G10L 15/30* | (2013.01) |
| *G10L 13/00* | (2006.01) |
| *G06F 40/56* | (2020.01) |

(52) U.S. Cl.
CPC ............ *G06F 40/268* (2020.01); *G06F 40/30* (2020.01); *G06F 40/56* (2020.01); *G10L 13/00* (2013.01); *G10L 15/1822* (2013.01); *G10L 15/22* (2013.01); *G10L 15/30* (2013.01); *G10L 2015/223* (2013.01)

(58) Field of Classification Search
CPC ............ G10L 2015/223; G06F 40/242; G06F 40/253; G06F 40/268; G06F 40/30; G06F 40/56; H04L 51/02
See application file for complete search history.

(56) References Cited

U.S. PATENT DOCUMENTS

| | | | | |
|---|---|---|---|---|
| 6,810,376 | B1* | 10/2004 | Guan | G06F 40/30 704/9 |
| 7,124,081 | B1* | 10/2006 | Bellegarda | G10L 15/1815 704/255 |
| 8,515,736 | B1* | 8/2013 | Duta | H04M 3/5232 704/9 |
| 9,037,464 | B1* | 5/2015 | Mikolov | G10L 15/06 704/255 |
| 10,102,845 | B1* | 10/2018 | Abu Zaki | G10L 15/26 |
| 2001/0053974 | A1* | 12/2001 | Lucke | G10L 15/187 704/240 |
| 2003/0105638 | A1* | 6/2003 | Taira | G10L 15/005 704/275 |
| 2003/0130976 | A1* | 7/2003 | Au | G06F 16/3344 706/55 |
| 2005/0273336 | A1* | 12/2005 | Chang | G06F 40/30 704/257 |
| 2006/0020461 | A1* | 1/2006 | Ogawa | G10L 15/04 704/251 |
| 2006/0020473 | A1* | 1/2006 | Hiroe | G10L 13/027 704/275 |
| 2006/0265209 | A1* | 11/2006 | Bradford | G06F 40/42 704/9 |
| 2007/0005701 | A1* | 1/2007 | Bareness | H04L 51/04 709/205 |
| 2007/0033040 | A1* | 2/2007 | Huang | G10L 15/1822 704/254 |
| 2007/0055649 | A1* | 3/2007 | Tsuzuki | G06F 16/3322 |
| 2009/0089046 | A1* | 4/2009 | Uchimoto | G06F 40/247 704/9 |
| 2011/0264439 | A1* | 10/2011 | Sata | G06F 40/45 704/4 |
| 2012/0010870 | A1* | 1/2012 | Selegey | G06F 40/55 704/3 |
| 2014/0257792 | A1* | 9/2014 | Gandrabur | G10L 15/1815 704/9 |
| 2015/0142704 | A1* | 5/2015 | London | G06N 5/022 706/11 |
| 2015/0178268 | A1* | 6/2015 | Zuev | G06F 40/45 704/9 |
| 2015/0261743 | A1* | 9/2015 | Sengupta | G06F 40/232 704/9 |
| 2016/0133146 | A1* | 5/2016 | Bak | G10L 15/1822 434/322 |
| 2016/0371254 | A1* | 12/2016 | Yamagami | G06N 3/08 |
| 2017/0011289 | A1* | 1/2017 | Gao | G06F 40/268 |
| 2017/0069316 | A1* | 3/2017 | Makino | G10L 15/22 |
| 2017/0103059 | A1* | 4/2017 | Cai | G06F 40/137 |
| 2017/0118269 | A1* | 4/2017 | Park | H04L 69/16 |
| 2017/0199867 | A1* | 7/2017 | Koji | G06F 40/284 |
| 2017/0239576 | A1* | 8/2017 | Hsiao | G06F 8/41 |
| 2019/0279647 | A1* | 9/2019 | Jones | G16H 10/20 |
| 2020/0143792 | A1* | 5/2020 | Iwata | G06F 16/3329 |
| 2020/0210505 | A1* | 7/2020 | Yang | G06F 40/30 |

OTHER PUBLICATIONS

English Translation of International Preliminary Report on Patentability Chapter I for PCT/JP2017/031012 (WO 2018123139 A1), dated Jul. 2, 2019 (Year: 2019).*

English Translation of Notice of Reasons for Refusal for JP 2018558806 (JP WO2018123139 A1), dated Jun. 9, 2020 (Year: 2020).*

English Translation of Decision to Grant a Patent for JP 2018558806 (JP WO2018123139 A1), dated Nov. 17, 2020 (Year: 2020).*

Hashimoto, Takashi. "Usage-based Structuralization of Relationships between Words", 1997, In P. Husbands & I. Harvey (Eds.), Proceedings of the Fourth European Conference on Artificial Life (pp. 483-492) (Year: 1997).*

* cited by examiner

| INPUT-OUTPUT SENTENCE | USER | SYSTEM | DATE AND TIME | LOCATION INFORMATION | CATEGORY | PARENT CATEGORY | INTENTION | NODE LINK |
|---|---|---|---|---|---|---|---|---|
| AN APPLE IS RED. | 1 | 0 | 2016.10.26. 13:45 | 34.451243, 132.709801 | FRUIT AND PROCESSED FRUIT | FOOD | AFFIRMATION | 1, 2 |
| A SOUVENIR FROM OSAKA IS TAKOYAKI. | 0 | 1 | 2016.10.27. 18:03 | 34.451243, 132.709801 | OSAKA PREFECTURE, TAKOYAKI, OKONOMIYAKI | REGION IN JAPAN, FOOD | AFFIRMATION, PROPOSAL | 3, 4, 5 |

(b)

| NODE NUMBER | NODE | PRONUNCIATION | CATEGORY | PARENT CATEGORY | PART OF SPEECH | ACCOMPANYING INFORMATION |
|---|---|---|---|---|---|---|
| 1 | APPLE | RINGO | FRUIT AND PROCESSED FRUIT | FOOD | NOUN | WHAT |
| 2 | RED | AKAI | COLOR | COLOR | ADJECTIVE | HOW |
| 3 | OSAKA | OOSAKA | OSAKA PREFECTURE | IN JAPAN, REGION | NOUN | WHAT |
| 4 | SOUVENIR | MIYAGE | N/A | N/A | NOUN | WHAT |
| 5 | TAKOYAKI | TAKOYAKI | OSAKA PREFECTURE, TAKOYAKI, OKONOMIYAKI | RESTAURANT | NOUN | WHAT |

(c)

| PARTICLE | NODE 1 | NODE 2 |
|---|---|---|
| WA (JAPANESE PARTICLE) | 1 | 2 |
| NO (JAPANESE PARTICLE) | 3 | 4 |
| WA (JAPANESE PARTICLE) | 4 | 5 |

ANSWERING DEVICE, CONTROL METHOD FOR ANSWERING DEVICE, AND RECORDING MEDIUM

TECHNICAL FIELD

The present invention relates to, for example, a response device configured to form a response sentence to a sentence inputted by a user.

BACKGROUND ART

A device and a system each configured to receive an input sentence of an input sentence from a user and form a response sentence to the input sentence are conventionally being researched and developed. For example, Patent Literature 1 below discloses a technique for (i) determining, from similarity between (a) a name that has been detected in a remark made by a user and (b) respective names of persons which names are stored in a non-volatile memory, a person indicated by that name and (ii) returning a remark about that person in a form of a reply to the user.

CITATION LIST

Patent Literature

[Patent Literature 1] Japanese Patent Application Publication, No. 2004-334591 (Publication Date: Nov. 25, 2004)

SUMMARY OF INVENTION

Technical Problem

However, such a conventional technique described earlier may make it impossible to form a response sentence that is satisfactory to a user. For example, in a case where a remark made by a user contains an unknown word whose meaning and/or the like is unclear, the conventional technique makes it impossible to return a reply that conforms to content of the unknown word. In addition, the conventional technique makes it impossible to return a proper reply in a common case where the same person is called in a plurality of ways that are dissimilar to each other.

An object of an aspect of the present invention is to achieve, for example, a response device capable of forming a response sentence that is satisfactory to a user.

Solution to Problem

In order to attain the object, a response device of an aspect of the present invention is a response device configured to form a response sentence to an input sentence, the response device including: a detection section configured to, in a case where the input sentence contains an unknown word, which is a word with which no given information that the response device uses to form the response sentence is associated, detect a related term, which is a known word that shares, with the unknown word, at least one shared word, which is a word that is used in an identical sentence; and a response sentence forming section configured to form the response sentence whose content is related to the related term that has been detected by the detection section.

In order to attain the object, another response device of an aspect of the present invention includes: a detection section configured to, in at least one of a case where the input sentence contains a word that has another designation and a case where the input sentence is a sentence that is related to the word, detect a related designation, which is a designation that shares, with the word, a shared word, which is a word that is used in an identical sentence; and a response sentence forming section configured to form the response sentence whose content is related to the related designation that has been detected by the detection section.

In order to attain the object, a method of an aspect of the present invention for controlling a response device is a method for controlling a response device configured to form a response sentence to an input sentence, the method including: a detection step of, in a case where the input sentence contains an unknown word, which is a word with which no given information that the response device uses to form the response sentence is associated, detect a related term, which is a known word that shares, with the unknown word, at least one shared word, which is a word that is used in an identical sentence; and a response sentence forming step of forming the response sentence whose content is related to the related term that has been detected by the detection step.

In order to attain the object, another method of an aspect of the present invention for controlling a response device is a method for controlling a response device configured to form a response sentence to an input sentence, the method including: a detection step of, in at least one of a case where the input sentence contains a word that has another designation and a case where the input sentence is a sentence that is related to the word, detect a related designation, which is a designation that shares, with the word, a shared word, which is a word that is used in an identical sentence; and a response sentence forming step of forming the response sentence whose content is related to the related designation that has been detected by the detection step.

Advantageous Effects of Invention

An aspect of the present invention brings about an effect of allowing a response sentence that is satisfactory to a user to be formed.

BRIEF DESCRIPTION OF DRAWINGS

FIG. 2 is a view showing an example of a dialogue history DB.

DESCRIPTION OF EMBODIMENTS

Embodiment 1

[Configuration of Response Device]

Figure 1:
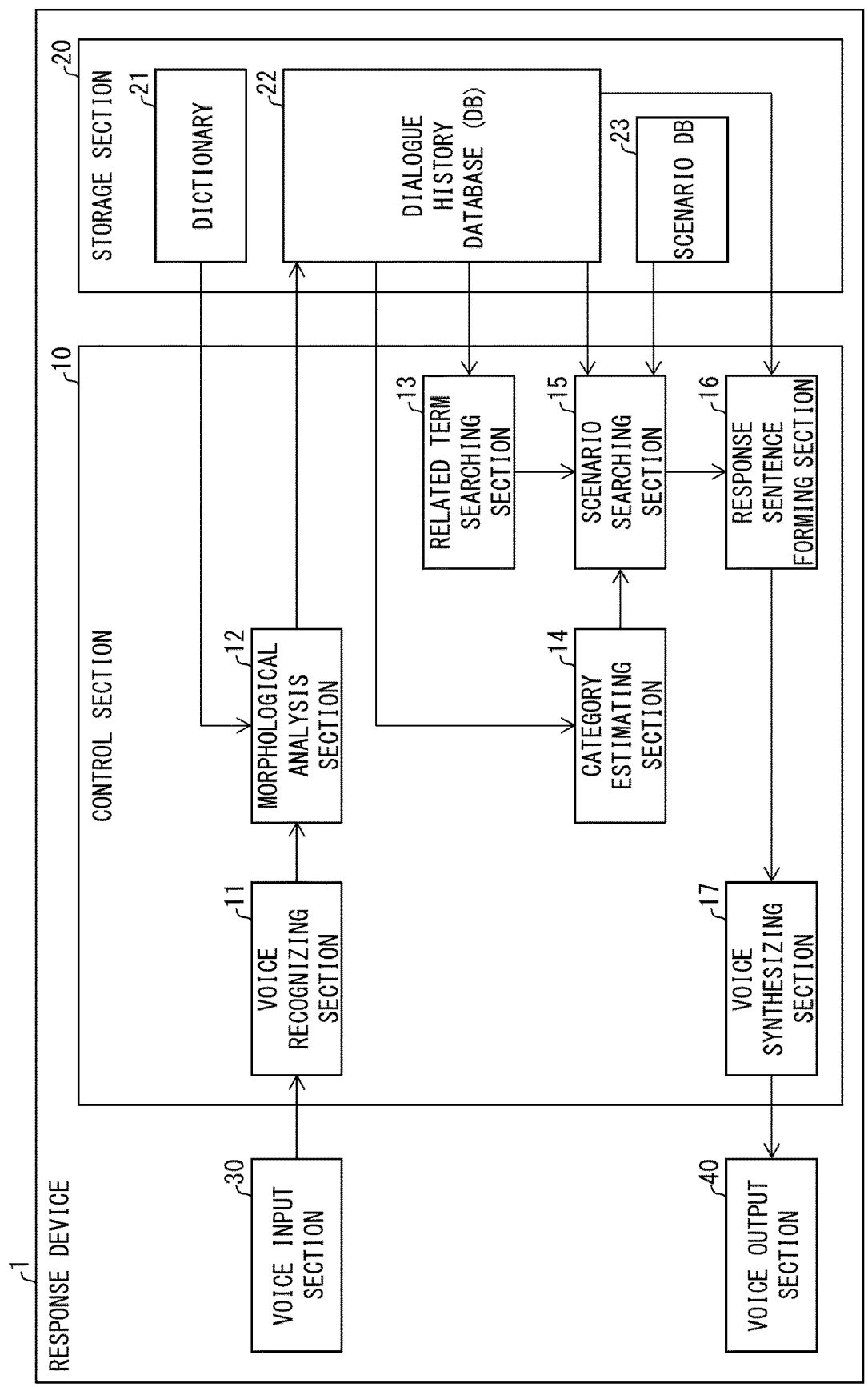
FIG. 1 is a block diagram showing an example of a configuration of a main part of a response device in accordance with Embodiment 1 of the present invention.

A response device in accordance with Embodiment 1 will be described with reference to FIG. 1. FIG. 1 is a block diagram showing an example of a configuration of a main part of a response device 1. The response device 1 is a device configured to form a response sentence to a sentence inputted by a user. Embodiment 1 will describe an example in which, assuming that a message that a user has given by voice is an input sentence, the response device 1 outputs a response sentence to that input sentence by voice. Hereinafter, an input sentence and a response sentence may be collectively referred to as an "input-output sentence". An "input-output sentence" refers to an input sentence and/or an output sentence. Note that at least one of an input sentence and a response sentence can be a text message. A response sentence that is a text message can be outputted by display or by print.

The response device 1 includes: a control section 10 configured to collectively control sections of the response device 1; a storage section 20 configured to store various pieces of data to be used by the response device 1; a voice input section 30 configured to receive a voice input; and a voice output section 40 configured to output a voice. The control section 10 includes a voice recognizing section 11, a morphological analysis section 12, a related term searching section (detection section) 13, a category estimating section 14, a scenario searching section 15, a response sentence forming section 16, and a voice synthesizing section 17. The storage section 20 stores therein a dictionary 21, a dialogue history database (DB) 22, and a scenario DB 23.

The voice recognizing section 11 (i) recognizes a voice that has been supplied to the voice input section 30 and (ii) forms text data as a result of the recognition of the voice. That is, the voice recognizing section 11 forms text data on an input sentence.

The morphological analysis section 12 carries out morphological analysis with respect to the text data on the input sentence, which text data is the result of the recognition of the voice. During the morphological analysis, the text data on the input sentence is divided into morphemes, and information such as a part of speech and a meaning thereof, and/or a category is given, based on the dictionary 21, for each of the morphemes. Words belonging to the same category have a shared attribute corresponding to that category. Sentences belonging to the same category have a shared attribute corresponding to that category. It is determined in advance what word is classified as what category, what sentence is classified as what category, and how to define each category. A result of morphological analysis, together with the text data on the input sentence, is stored in, for example, the dialogue history DB 22 and is used in each of the sections such as the related term searching section 13.

In a case where an input sentence contains an unknown word, the related term searching section 13 searches for a related term, which is a known word that shares, with the unknown word, a way of being used in a sentence. More specifically, the related term searching section 13 (i) detects, in a database such as the dialogue history DB 22, a shared word, which is a word used in combination with an unknown word, and (ii) detects, in such a database, that a known word used in combination with the shared word is a related term. In other words, the related term searching section 13 detects a related term that shares a shared word with an unknown word. Note that an unknown word is a word with which no given information that the response device 1 uses to form a response sentence is associated. Examples of the given information include a meaning of a word and a category to which the word belongs. Embodiment 1 treats, as an unknown word, a word that the dictionary 21 does not register as a direction word. A new word, a coined word, an abbreviated word, and the like that the dictionary 21 does not register as direction words are also included in the scope of an unknown word. In contrast, a known word is a word with which the given information is associated. Embodiment 1 assumes that the dictionary 21 also registers meaning and a category of a word that the dictionary 21 registers as a direction word. That is, Embodiment 1 treats, as a known word, a word that the dictionary 21 registers as a direction word.

In a case where an input sentence contains a word that has another designation, the related term searching section 13 detects a related designation, which is a designation that shares, with the word, a way of being used in a sentence. In other words, the related term searching section 13 detects a related designation that shares a shared word with a word that has another designation. The following description will discuss an example in which a word that has another designation is a common noun that refers to a person. Such a common noun has at least another designation, which is a proper noun that refers to that person. Since the word is a common noun that refers to a person, the following description will refer to the related designation as a related name. Note that a word that has another designation is not limited to the above example provided that the word has another designation. Note also that the process described earlier for detecting a related designation can be carried out by a processing block that is provided separately from the related term searching section 13.

The category estimating section 14 estimates a category of an unknown word from a context of an input sentence. More specifically, the category estimating section 14 determines that a category of a shared word that is shared by an unknown word contained in an input sentence is a category of the unknown word. Even more specifically, in a case where an unknown word and a shared word are the subject and the predicate, respectively, of an input sentence and the predicate is a word that refers to a state or a property of the subject, the category estimating section 14 determines that the unknown word and the shared word are identical in category. That is, in a case where an input sentence has a sentence structure such as "<unknown word> is <A>.", the category estimating section 14 determines that the unknown word and "A" are identical in category. For example, in a case where "Jonathan" is an unknown word and an input sentence is "Jonathan is an apple.", the category estimating section 14 determines that "Jonathan" and the "apple" are identical in category (e.g., fruit). This allows a conversation related to an apple to be continued also in a case where a new variety of apple appears in a conversation.

Similarly, in a case where an input sentence has a sentence structure such as "<B> is <unknown word>.", the category estimating section 14 can determine that the unknown word and "B" are identical in category. For example, also in a case where an input sentence is "An apple that is suitable for confectionery is Jonathan.", the category estimating section 14 can determine that "Jonathan" and the "apple" are identical in category (e.g., fruit).

The category estimating section 14 also determines a category of an unknown word from a category of an output sentence immediately preceding an input of an input sentence. More specifically, in a case where an input sentence consisting of a single clause, such as a greeting, contains an unknown word, the category estimating section 14 determines that the unknown word and an output sentence immediately preceding the input sentence are identical in category. For example, in a case where an input sentence inputted after the response device 1 has outputted "Good morning. (category: greeting)" by voice is "Chiisu (unknown word) [Hi/Hey].", the category estimating section 14 determines that a category of "chiisu" is a greeting. This makes it possible to return, also to an unknown word such as "chiisu", a proper response sentence such as "Today is also a fine day."

The scenario searching section 15 searches the scenario DB 23 for a scenario to be used to form a response sentence. Note that according to Embodiment 1, a "scenario" defines an outline of content of a response sentence and includes a template to form a response sentence. A method for searching for a scenario will be described later together with details of the scenario DB 23.

The response sentence forming section 16 forms a response sentence. Though a method for forming a response sentence will be described later, in a case where the related term searching section 13 detects a related term, the response sentence forming section 16 forms a response sentence whose content is related to that related term. Furthermore, in a case where the related term searching section 13 detects a related name, the response sentence forming section 16 forms a response sentence whose content is related to that related name.

The voice synthesizing section 17 synthesizes, into voice data, a response sentence formed by the response sentence forming section 16. The voice data into which the response sentence has been synthesized is supplied from the voice output section 40 by voice.

The dictionary 21 is used to carry out morphological analysis. The dictionary 21 can have, for example, a data structure in which a part of speech, a meaning, and the like are associated with a direction word. It is possible to apply, to the dictionary 21, any dictionary that contains information that allows morphological analysis to be carried out with respect to an input sentence. The morphological analysis section 12 determines that a word that the dictionary 21 does not register as a direction word is an unknown word. A word for which the morphological analysis section 12 does not determine that the word is an unknown word is a known word.

The dialogue history DB 22 is a database that stores (i) an input sentence that is supplied to the response device 1 and (ii) an output sentence that is supplied from the response device 1. The dialogue history DB 22 can have a data structure such as a data structure of FIG. 2. FIG. 2 is a view showing an example of the dialogue history DB 22. Note that a table of (a) of FIG. 2 is the dialogue history DB 22, (b) of FIG. 2 shows a node database (DB) that is associated with the dialogue history DB 22, and (c) of FIG. 2 shows a node link database (DB) that is associated with the node database.

The dialogue history DB 22 shown in (a) of the FIG. 2 is a table in which records of an input-output sentence, a user, a system, the date and time, location information, a category, a parent category, an intention, and a node link are associated with each other. "INPUT-OUTPUT SENTENCE" is text data on an input sentence or on an output sentence. The record of "USER" shows whether a speech is from a user, and the record of "SYSTEM" shows whether a speech is from a system, i.e., the response device 1. In the example illustrated in (a) of FIG. 2, "1" indicates affirmation and "0" indicates negation. That is, "AN APPLE IS RED." is a speech from a user, i.e., an input sentence, and "A SOUVENIR FROM OSAKA IS TAKOYAKI [octopus balls]." is a speech from the response device 1, i.e., an output sentence. "DATE AND TIME" indicates the date and time at which "INPUT-OUTPUT SENTENCE" was uttered, and "LOCATION INFORMATION" indicates a place at which "INPUT-OUTPUT SENTENCE" was uttered. "CATEGORY" is a category of content of "INPUT-OUTPUT SENTENCE", and "PARENT CATEGORY" is a parent (generic) category of the "CATEGORY". "INTENTION" is a result of behavioral analysis of content of "INPUT-OUTPUT SENTENCE". Examples of "INTENTION" include not only "affirmation" and "proposal" but also "question" and "desire". "NODE LINK" indicates an entry, in the node DB, of a node that is contained in an input-output sentence.

The node DB shown in (b) of FIG. 2 is a table in which records of a node number, a node, a pronunciation, a category, a parent category, a part of speech, and accompanying information are associated with each other. "NODE NUMBER" is an entry number of a node. "NODE" indicates a word that is contained in an input-output sentence, and "PRONUNCIATION" indicates how to pronounce (read) that word. "CATEGORY" indicates a category of a word, "PARENT CATEGORY" indicates a parent (generic) category of the "CATEGORY", and "PART OF SPEECH" indicates a part of speech of a word. "ACCOMPANYING INFORMATION", which indicates how a word is used in an input-output sentence, is any of "what", "when", "where", "who", "how", and "do".

The node link DB shown in (c) of FIG. 2 is a table in which a particle, a node 1, and a node 2 are associated with each other. "NODE 1" and "NODE 2" are words that are connected by "PARTICLE" and indicated by respective entry numbers of the node DB. For example, in the record in the first row of (c) of FIG. 2, "NODE 1" is "1" "NODE 2" is "2", and "WA" (a Japanese particle) is used. This shows that "APPLE" (NODE NUMBER 1) of (b) of FIG. 2 and "RED" (NODE NUMBER 2) of (b) of FIG. 2 are linked by "WA" (a Japanese particle).

The morphological analysis section 12 carries out morphological analysis with respect to an input-output sentence with use of the dictionary 21 so as to specify respective values of the records in the databases described earlier. That is, respective values of the category (input-output sentence as a whole), the parent category (input-output sentence as a whole), the intention, the node link, the node, the pronunciation, the category (node alone), the parent category (node alone), the part of speech, the accompanying information, and the particle are specified.

As described earlier, the node DB and the node link DB are each a database that stores a combination of words with respect to a plurality of input-output sentences. Though specifically described later, the related term searching section 13 detects, in those databases, a shared word that is combined with an unknown word (or a word that has another designation). Furthermore, the related term searching section 13 detects, in those databases, that a known word (designation) that is combined with the shared word thus detected is a related term (related designation).

The scenario DB 23 is a database that stores a scenario to be used to form a response sentence. The scenario DB 23 has a data structure that makes it possible to search for a scenario that meets various conditions of application. For example, the scenario DB 23 can alternatively have a data structure in which a condition of application of each scenario and a template of a response sentence are associated with each other. The condition of application can be a condition concerning, for example, a category of an input sentence, a word that is contained in the input sentence, and a word that is related to the word that is contained in the input sentence.

The condition of application of a scenario can include (i) a condition based on an input sentence (hereinafter referred to as an "input sentence condition") and (ii) a condition based on memory content of a past input-output sentence (hereinafter referred to as a "memory condition"). In this case, the scenario searching section 15 refers to (i) a result of voice recognition of an input sentence and (ii) a result of morphological analysis of the input sentence so as to determine whether the input sentence satisfies an input sentence condition. The input sentence condition can be, for example, a condition that a category of the input sentence as a whole is a given category and the input sentence contains a given word. Note that the input sentence condition can include at least one of, for example, the date and time at which an input sentence was inputted, a place at which the input sentence was inputted, and a category of a word. In this case, the scenario searching section 15 refers to the dialogue history DB 22, the node DB, and the node link DB so as to determine whether the input sentence satisfies a memory condition. The memory condition can be a condition that a word belonging to a given category and a given word are linked to each other. The memory condition can alternatively be, for example, (i) a condition that a given word and a given word are linked to each other or (ii) a condition that a word belonging to a first given category and a word belonging to a second given category (that can be identical to or different from the first "given category") are linked to each other. Note that the memory condition can include, for example, the date and time and/or a place.

Assume, for example, that the scenario DB 23 contains the following scenario.

Input sentence condition: An input sentence belongs to a category "fruit and processed fruit" and contains a word "red".

Memory condition: A word belonging to the category "fruit and processed fruit" is linked to the word "red".

Template: "<mNode1> is also red"

In this case, the scenario searching section 15 detects the above scenario in a case where the scenario searching section 15 (i) determines, from (a) a result of voice recognition of an input sentence and (b) a result of morphological analysis of the input sentence, that the input sentence satisfies the input sentence condition and (ii) determines, from the dialogue history DB 22, the node DB, and the node link DB, that the input sentence also satisfies the memory condition. For example, in a case where a user says "An apple is red", it is determined, from a result of voice recognition and a result of morphological analysis, that an input sentence related to that speech from the user belongs to the category "fruit and processed fruit" and contains "red". That is, the scenario searching section 15 determines that the above input sentence satisfies the input sentence condition of the above scenario. In a case where the dialogue history DB 22 stores a sentence "a strawberry is red" in this case, the scenario searching section 15 determines, from the node DB and the node link DB, that a word belonging to the category "fruit and processed fruit" and "red" are linked to each other. That is, the scenario searching section 15 determines that the input sentence also satisfies the memory condition of the above scenario. Thus, the scenario searching section 15 detects this scenario in the scenario DB 23. Then, the response sentence forming section 16 inserts, in a part <mNode1> of the template of that scenario, "strawberry", which is a word that has been detected during the determination of the memory condition (a word that belongs to the category "fruit and processed fruit" and is linked to "red" in the node link DB). This results in formation of a response sentence "A strawberry is also red." In a case where the dialogue history DB 22 further stores a sentence "A cherry is red.", it is also possible to form a response sentence "A cherry is also red." In a case where a plurality of words that can be inserted in the part <mNode1> are detected, it can be determined in advance how to determine a word to be inserted in that part.

[Search for Related Term]

Figure 3:
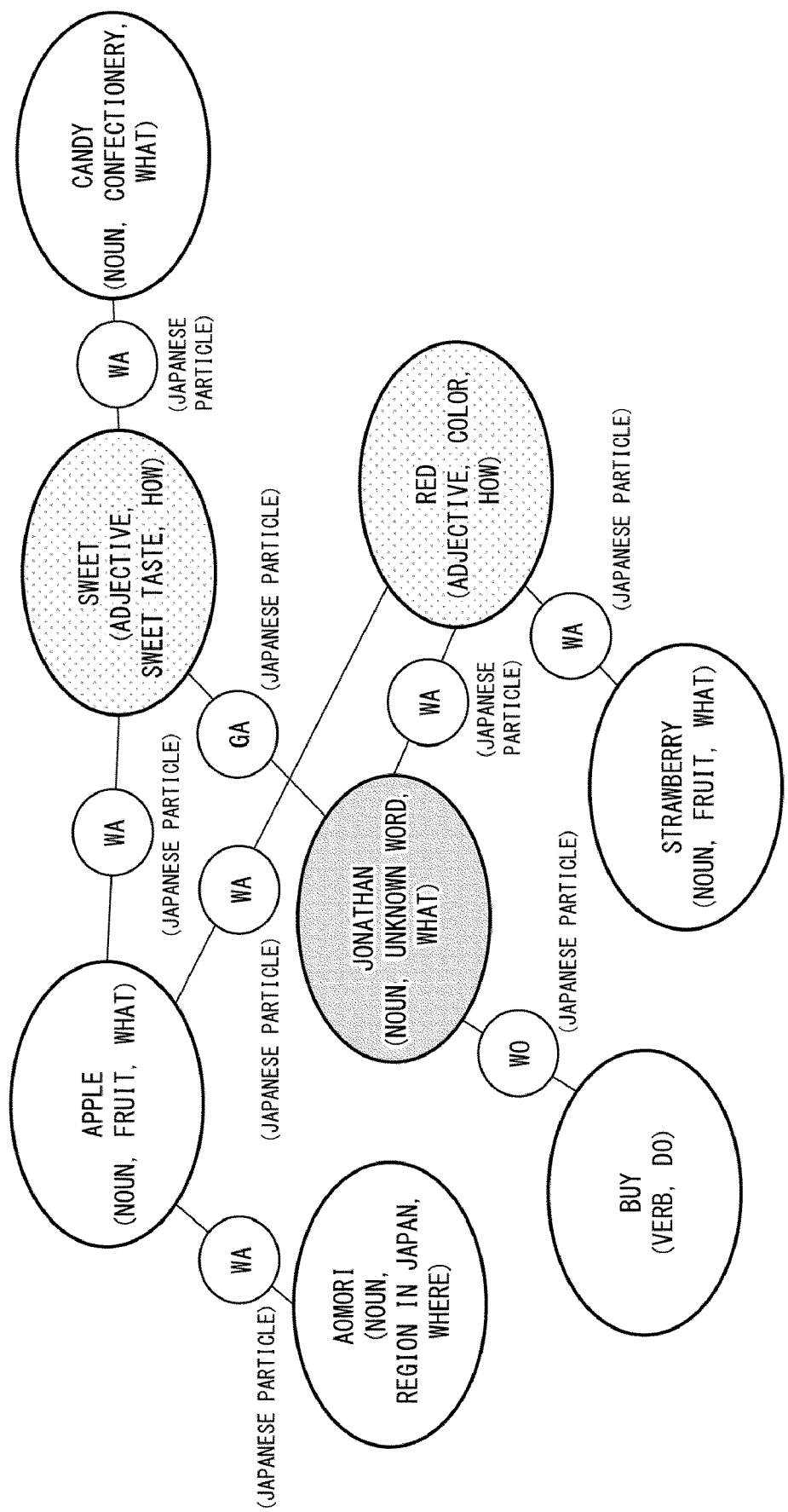
FIG. 3 is a view describing a method for searching for a related term.

Words each of which is connected to (used in combination with) a shared language are considered to be highly likely to be identical also in category. Thus, in accordance with a word that is connected to an unknown word, the related term searching section 13 searches for a related term whose category is highly likely to be identical to a category of the unknown word. This will be described with reference to FIG. 3. FIG. 3 is a view describing a method for searching for a related term.

In FIG. 3, a word (morpheme) stored in the dialogue history DB 22 and a result of morphological analysis of that word are described in each of ellipses. A line segment that connects ellipses indicates that words in the respective ellipses that are connected by the line segment are used in combination, and a particle that connects those words is described in a circle that is located on that line segment. In this example, only "JONATHAN" is an unknown word, and the other words are each an known word.

In the example shown in FIG. 3, "JONATHAN" is an unknown word. "JONATHAN" is linked to and used in combination with "BUY", "RED", and "SWEET". Thus, the related term searching section 13 specifies first that three words, which are "BUY", "RED", and "SWEET", are shared words each of which is used in combination with "JONATHAN".

Next, the related term searching section 13 searches for other words that have the shared words thus specified. Through the search for the other words, the related term searching section 13 (i) detects "APPLE", and "STRAWBERRY", that share the word "RED" and (ii) detects "APPLE" and "CANDY" that share the word "SWEET". Of those words detected, "STRAWBERRY", which shares only one word "RED" with "JONATHAN", is not regarded as a related term. Furthermore, "CANDY", which also shares only one word with "JONATHAN", is not regarded as a related term. In contrast, "APPLE", which shares a plurality of words ("RED" and "SWEET") with "JONATHAN", is regarded as a related term. Specifically, "APPLE", which shares, with "Jonathan", two properties, which are "RED" and "SWEET", is regarded as a term that is related to "JONATHAN". More specifically, the related term searching section 13 (i) detects a plurality of kinds of shared words for an unknown word and (ii) detects that a known word used in combination with at least two of the plurality of kinds of shared words is a related term.

This allows the related term searching section 13 to detect that "APPLE" is a term that is related to "JONATHAN". Furthermore, since "APPLE" is a known word, a category of "APPLE" can be specified. Since "APPLE" and "JONATHAN" have a shared property, it can be estimated that "APPLE" and "JONATHAN" also share a category. For example, in a case where a category of "APPLE" is fruit, a category of "JONATHAN" can also be regarded as fruit.

The following description will discuss a method for detecting a related term with use of the DBs shown in FIG. 2. First, the related term searching section 13 (i) detects, in the node DB ((b) of FIG. 2), a record in which "NODE" is "JONATHAN" and (ii) specifies a node number of "JONATHAN" in accordance with the record detected. Next, the related term searching section 13 detects, in the node link DB ((c) of FIG. 2), a plurality of node numbers each of which is associated with the node number thus specified. The related term searching section 13 specifies that words which have those node numbers are shared words.

Next, for each of the plurality of node numbers (node numbers of the shared words) detected, the related term searching section 13 detects, in the node link DB, node numbers that are associated with the respective plurality of node numbers (node numbers of words each serving as a candidate for a related term). Then, the related term searching section 13 extracts, out of the node numbers detected, a node number that is combined with at least two of the plurality of node numbers of the shared words. Note that a node number that is combined with one of the node numbers of shared words can also be extracted. Finally, the related term searching section 13 (i) specifies, in accordance with the node DB, a node that has the node number extracted and (ii) detects that a word which has the node thus specified is a related term.

Thus, the response device 1 that includes the related term searching section 13 can form, from a scenario of fruit, a response sentence for "JONATHAN", which is an unknown word. This allows a natural conversation to be made with a user. For example, in a case where there is a scenario "[fruit] that is cooled is delicious", the response device 1 can return, to an input sentence that has been inputted by a user and says about "JONATHAN", a response sentence that says "Jonathan that is cooled is delicious."

In the example of FIG. 3, in a case where words that share "STRAWBERRY" include "SWEET", "STRAWBERRY" and "JONATHAN" also share two shared words, so that it is detected that "STRAWBERRY" is also a related term. Furthermore, in a case where words that share a noun "CHERRY" (not illustrated in FIG. 3) include "SWEET" and "RED", it is detected that "CHERRY" is also a related term. As described above, also in a case where a plurality of related terms are detected and the plurality of related terms are identical in category (each belong to "fruit" in Embodiment 1), that category can be considered, as it is, to be a category of an unknown word.

In contrast, in a case where words that share "CANDY" illustrated in FIG. 3 include "RED", it can be detected that "CANDY" is also a related term. "CANDY", whose category is "CONFECTIONERY", differs from "FRUIT", which is a category of "APPLE". In such a case, the related term searching section 13 can (i) search nouns whose category is "FRUIT" and nouns whose category is "CONFECTIONERY" for another noun that shares a shared word with "JONATHAN" and (ii) apply a category of a noun detected. For example, in the example shown in FIG. 3, "STRAWBERRY", which belongs the category "FRUIT", has "RED", which is a word that "STRAWBERRY" shares with "JONATHAN". In contrast, "CANDY" is the only word that belongs to the category "CONFECTIONERY". Thus, the related term searching section 13 can apply "FRUIT" to the category of "JONATHAN". Note that a process for determining a category of a related term can alternatively be carried out by the scenario searching section 15.

The response device 1 thus estimates and assigns a categor(ies) also to an unknown word(s) (e.g., an abbreviated word, a new word, and/or the like) that frequently appear(s) in a natural conversation and whose category cannot be specified. This makes it possible to form a response sentence from a proper scenario.

[Search for Related Name]

Figure 4:
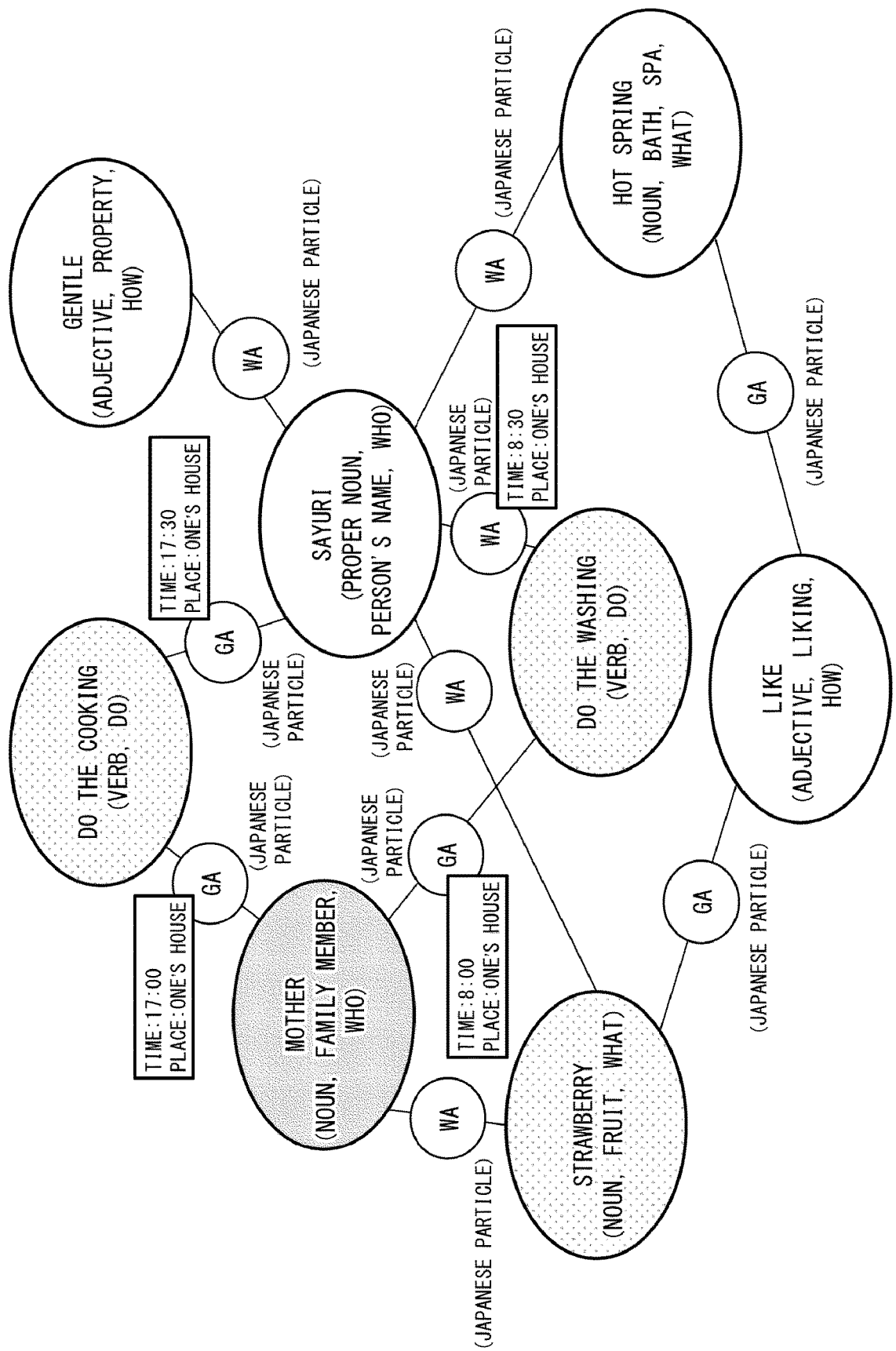
FIG. 4 is a view describing a method for searching for a related name.

The following description will discuss search for a related name with reference to FIG. 4. FIG. 4 is a view describing a method for searching for a related name. Search for a related name is carried out substantially as in the case of search for a related term except that search for a related name is carried out in view of a time period and a place at each of which an input-output sentence was uttered.

In FIG. 4, a word (morpheme) stored in the dialogue history DB 22 and a result of morphological analysis of that word are described in each of ellipses. A line segment that connects ellipses indicates that words in the respective ellipses that are connected by the line segment are used in combination, and a particle that connects those words is described in a circle that is located on that line segment. Furthermore, a time and a place at each of which an input sentence that contains a word that is described in an ellipse was received by the response device 1 (an output sentence was outputted by the response device 1) are described in a rectangle.

In the example shown in FIG. 4, "MOTHER" is a common noun that refers to a person. First, the related term searching section 13 specifies that three words, which are "STRAWBERRY", "WASHING", and "DO THE COOKING", share a word "MOTHER".

Next, the related term searching section 13 searches for another word that (i) has any of the words thus specified, (ii) shares, with an input sentence that contains "MOTHER", a place and a time period at each of which the another word was uttered, and (iii) refers to a person's name. It can be inferred that designations that share a shared word are each a designation of the same person. Furthermore, in a case where (i) an input-output sentence which contains that designation and (ii) an input sentence were uttered at a shared place and at a shared time period, the input-output sentence and the input sentence were uttered in a shared situation. This makes it highly likely that designations that are contained in the input-output sentence and the input sentence, respectively, are each a designation of the same person. Thus, according to the above search, it is possible to detect that a designation of the same person as "MOTHER" is a related name. Note that either a place or a time period can be used as a condition under which to search for a related name. The "another word that refers to a person's name" can be (i) a proper noun that refers to a person's name or (ii) another common noun that refers to a person's name. Furthermore, it is possible to subject nouns as a whole to search for a related name without causing a search condition to include, for example, whether a word refers to a person's name, whether a word is a common noun, or whether a word is a proper noun.

For example, in the example shown in FIG. 4, the related term searching section 13 detects a proper noun "SAYURI" that is used in an identical sentence with a word "STRAWBERRY" and refers to a person's name. In the example illustrated in FIG. 4, an input sentence that says "MOTHER" does "THE WASHING" was uttered at her house at 8:00, and an input sentence that says "SAYURI" does "THE WASHING" was uttered at her house at 8:30. Thus, the related term searching section 13 (i) determines that those input sentences were uttered at a shared place and at a shared time period and (ii) determines that "THE WASHING" is also a word that is shared by "SAYURI" and "MOTHER".

Note that time period divisions can be determined in advance. For example, in a case where a time period from 5:00 to 10:00 is defined, it is possible to determine that 8:00 and 8:30, both of which are included in that time period, share a time period. Note that a place can also be divided in accordance with, for example, a latitudinal and longitudinal range. For example, in a case where the response device 1 registers a latitudinal and longitudinal range of "one's house" in advance, it is possible to determine, by obtaining, with use of Global Positioning System (GPS), latitudinal and longitudinal information indicative of a location of the response device 1 that received an input of an input sentence, whether the input was carried out at one's house or at a place different from the one's house. Of course, a method for determining whether a place and a time period are shared is not limited to such a method as described above. For example, it is possible to determine that times that differ by a time that is not more than a predetermined time share a time period (time). Similarly, it is also possible to determine that places that differ in latitude and longitude by a value that is not more than a predetermined value share a place.

Furthermore, the related term searching section determines that "THE COOKING" as well as "THE WASHING" is also a word that is shared by "SAYURI" and "MOTHER". The related term searching section 13 detects, through the process described above, that "SAYURI" is a related name that has a plurality of words that "SAYURI" shares with "MOTHER".

The following description will discuss a method for detecting a related term with use of the DBs shown in FIG. 2. First, the related term searching section 13 (i) detects, in the node DB ((b) of FIG. 2), a record in which "NODE" is "MOTHER" and (ii) specifies a node number of "MOTHER" in accordance with the record detected. Next, the related term searching section 13 detects, in the node link DB of FIG. 2), a plurality of node numbers each of which is associated with the node number thus specified. The related term searching section 13 specifies that words which have those node numbers are shared words. Furthermore, the related term searching section 13 specifies, in accordance with the dialogue history DB 22 ((a) of FIG. 2), a time period and a place at each of which an input-output sentence that contains the words which have those node numbers was uttered.

Next, for each of the plurality of node numbers (node numbers of the shared words) detected, the related term searching section 13 detects, in the node link DB, node numbers that are associated with the respective plurality of node numbers (node numbers of words each serving as a candidate for a related name). Note that the related term searching section 13 is to detect node numbers of nodes that are contained in an input-output sentence that was uttered at the time period and the place each of which has been thus specified. Then, the related term searching section 13 extracts, out of the node numbers detected, a node number that is combined with at least two of the plurality of node numbers of the shared words. Finally, the related term searching section 13 (i) specifies, in accordance with the node DB, a node that has the node number extracted and (ii) detects that a word which has the node thus specified is a related name.

[Meaning of Specification of Related Name]

Figure 5:
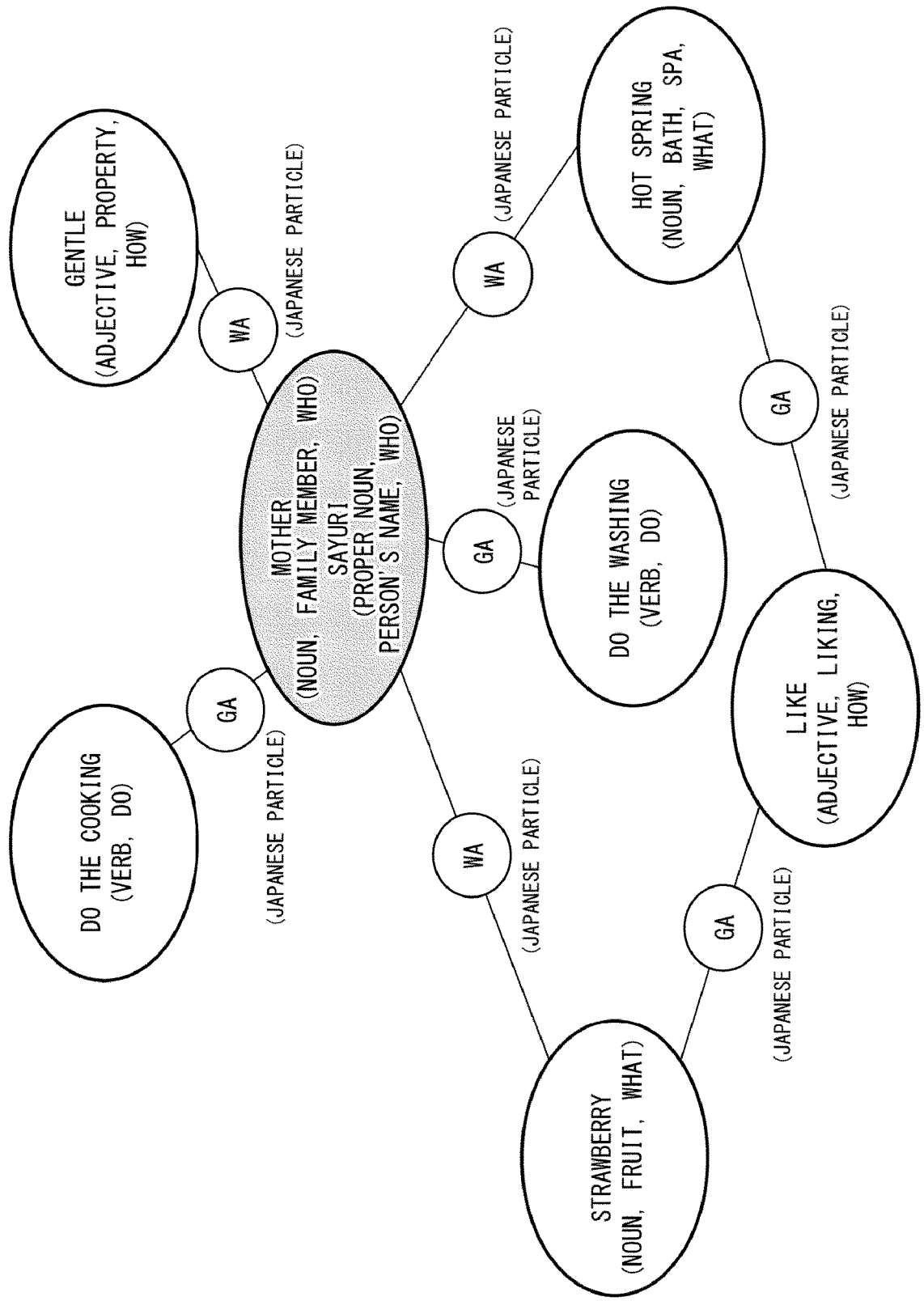
FIG. 5 is a view in which an association among words illustrated in FIG. 4 is restructured based on an estimation that "MOTHER" and "SAYURI" refer to the same person.

Specification of a related name makes it possible to form a response sentence that is related to each input-output sentence that is stored in the dialogue history DB 22 and contains that related name. This will be described with reference to FIG. 5. FIG. 5 is a view in which an association among words illustrated in FIG. 4 is restructured based on an estimation that "MOTHER" and "SAYURI" refer to the same person.

Assume that "MOTHER" and "SAYURI" are considered to refer to the same person. In this case, an input-output sentence that contains "MOTHER" can also be considered to be an input-output sentence that says about "SAYURI", and, similarly, an input-output sentence that contains "SAYURI" can also be considered to be an input-output sentence that says about "MOTHER". For example, as illustrated in FIG. 4, it can be considered, based on an input sentence which says that "SAYURI" "LIKES" "HOT SPRING", that "MOTHER" "LIKES" "HOT SPRING". This makes it possible to form, in a case where an input sentence contains "MOTHER", a response sentence that is related to a love for a hot spring. For example, it is possible to form a response sentence "Let's go to a hot spring that Mother likes." to an input sentence "Mother will take a day off tomorrow." This makes it unnecessary for a user to use a fixed appellation for the same person. In other words, it is possible to relieve a user from a burden that is placed on the user who is selecting a language to use in an input sentence.

Furthermore, the related term searching section 13 that has detected a related name for a common noun that refers to a person desirably stores an association between the common noun and the related name. This makes it possible to (i) prevent similar sentences from being formed for the same person and (ii) prevent a user from feeling those sentences redundant. For example, in a case where "MOTHER" and "SAYURI" refer to the same person, it is possible to prevent a response sentence "Happy birthday, Sayuri," from being further formed and outputted after a response sentence "Happy birthday, Mother." is formed and outputted.

[Flow of Process (From Reception of Voice Input to Output of Response Voice)]

Figure 6:
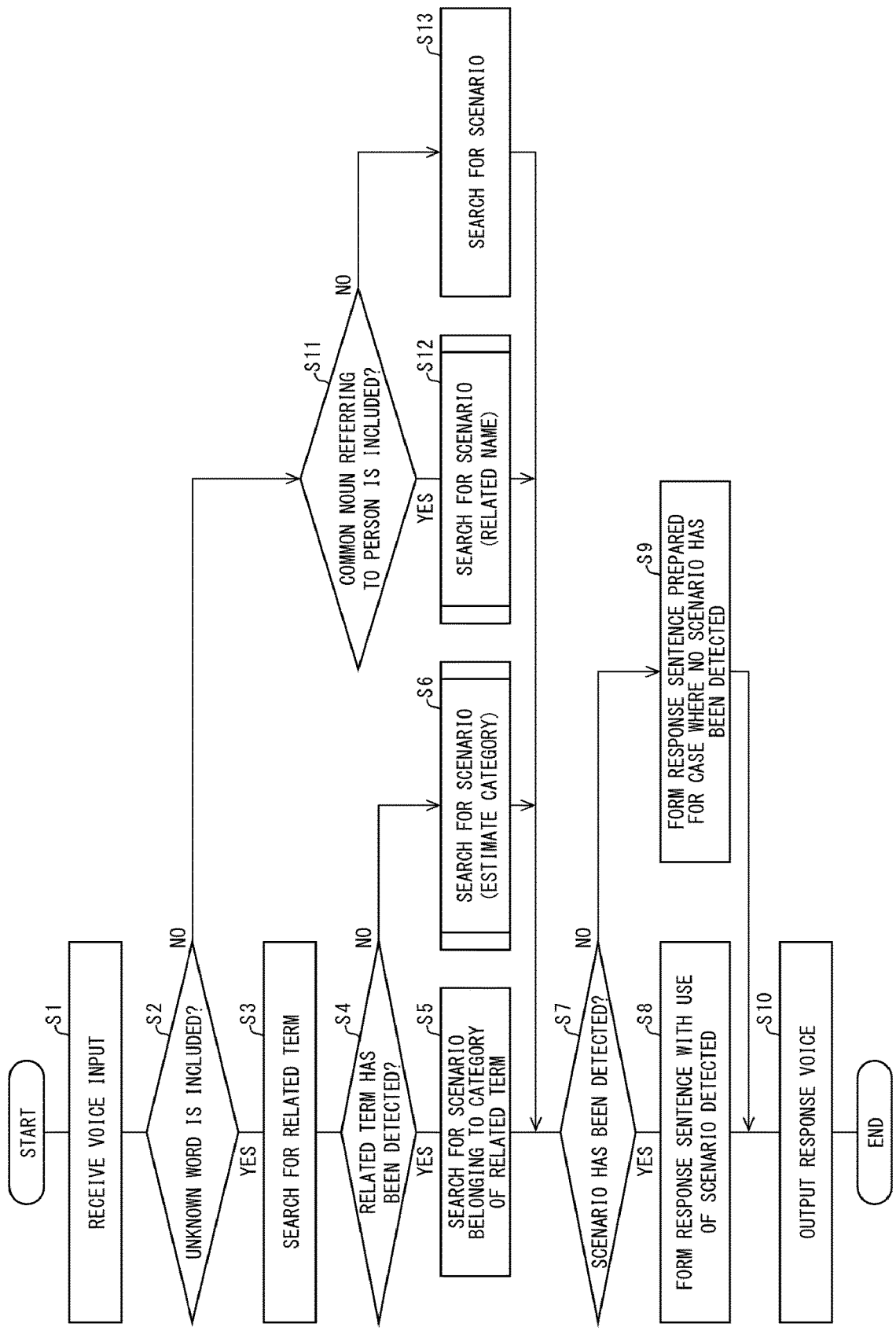
FIG. 6 is a flowchart showing an example of a process that the response device carries out during a period from when the response device receives a voice input to when the response device outputs a response voice.

The following description will discuss, with reference to FIG. 6, a flow of a process that the response device 1 carries out (a method for controlling the response device). FIG. 6 is a flowchart showing an example of a process that the response device 1 carries out during a period from when the response device receives a voice input to when the response device 1 outputs a response voice.

In S1, the voice input section 30 receives a voice from a user, i.e., a voice input of a message given by the user. The voice recognizing section 11 recognizes that voice and forms text data. Then, the morphological analysis section 12 carries out morphological analysis with respect to that text data. A result of the morphological analysis is recorded in, for example, the dialogue history DB 22 as described earlier. A time and a place at each of which the voice input section 30 received the voice input are also recorded. Note that the place can be specified by, for example, using GPS.

In S2, the related term searching section 13 determines whether the result of morphological analysis includes an unknown word. In a case where the related term searching section 13 determines in S2 that the result of morphological analysis includes an unknown word (YES in S2), the process proceeds to a step S3. In a case where the related term searching section 13 determines in S2 that the result of morphological analysis includes no unknown word (NO in S2), the process proceeds to a step S11.

In S3 (a detection step), the related term searching section 13 searches for a related term that is related to an unknown word for which the related term searching section 13 has determined in S2 that the result of morphological analysis includes the unknown word. In S4 following S3, the related term searching section 13 determines whether the related term has been detected by the search. In a case where the related term searching section 13 determines in S4 that the related term has been detected (YES in S4), the process proceeds to a step S5. In a case where the related term searching section 13 determines in S4 that no related term has been detected (NO in S4), the process proceeds to a step S6.

In S5, the scenario searching section 15 searches for a scenario that belongs to a category of the related term that has been detected by the related term searching section 13. Thereafter, the process proceeds to S7. Though specifically described later with reference to FIG. 7, in S6, the scenario searching section 15 searches for a scenario after estimating a category. Thereafter, the process proceeds to S7.

In S7, the scenario searching section 15 determines whether the scenario has been detected. In a case where the scenario searching section 15 determines in S7 that the scenario has been detected (YES in S7), the process proceeds to a step S8. In a case where the scenario searching section 15 determines in S7 that no scenario has been detected (NO in S7), the process proceeds to a step S9.

In S8 (a response sentence forming step), the response sentence forming section 16 forms a response sentence with use of the scenario that has been detected by the scenario searching section 15. Thereafter, the process proceeds to a step S10. In a case where the related term has been detected by the search carried out in S3, the response sentence that is formed in S8 has content that is related to the related term. In a case where a related name has been detected in a step S12, the response sentence that is formed in S8 has content that is related to the related name.

In S9, the response sentence forming section 16 forms a response sentence that is prepared in advance for a case where no scenario has been detected. Thereafter, the process proceeds to the step S10. Such a response sentence can be registered in advance in, for example, the scenario DR 23.

In S10, the voice synthesizing section 17 (i) synthesizes voice data from the response sentence that the response sentence forming section 16 has formed in S8 or S9 and causes the voice output section 40 to output the voice data synthesized. This ends the process illustrated in FIG. 6.

In S11, the related term searching section 13 determines whether the result of morphological analysis includes a common noun that refers to a person. In a case where the related term searching section 13 determines in S11 that the result of morphological analysis includes a common noun that refers to a person (YES in S11), the process proceeds to the step S12. In a case where the related term searching section 13 determines in S11 that the result of morphological analysis includes no common noun that refers to a person (NO in S11), the process proceeds to a step S13.

Though specifically described later with reference to FIG. 8, in S12, the scenario searching section 15 searches for a scenario after searching for a related name that is related to the common noun. Thereafter, the process proceeds to S7. In S13, the scenario searching section 15 searches for a scenario in accordance with the result of morphological analysis and an input-output sentence that is related to that result, the input-output sentence being stored in, for example, the dialogue history DB 22. Thereafter, the process proceeds to S7. S7 and the steps subsequent to S7 are as described earlier.

[Flow of Process (From Category Estimation to Scenario Search)]

Figure 7:
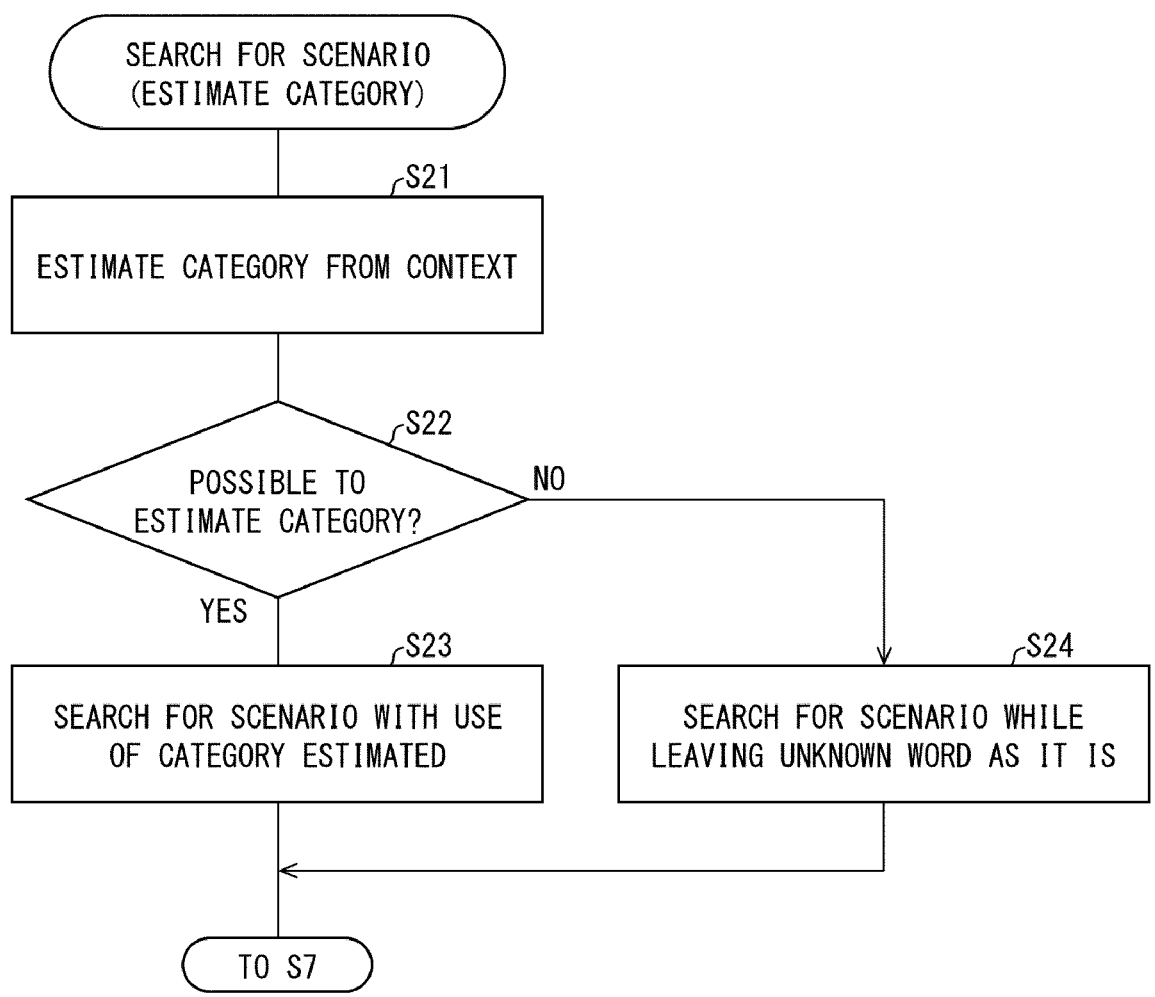
FIG. 7 is a flowchart showing an example of a process that the response device carries out so as to search for a scenario after estimating a category of an unknown word.

The following description will specifically discuss the step S6 of FIG. 6 with reference to FIG. 7. FIG. 7 is a flowchart showing an example of a process that the response device 1 carries out so as to search for a scenario after estimating a category of an unknown word.

In S21, the category estimating section 14 estimates (determines) a category of an unknown word from (i) the context of an unknown word that is contained in an input sentence or (ii) the context of (a) an output sentence that the response device 1 has outputted immediately before receiving an input sentence and (b) that input sentence. A specific method for determining the category is as described earlier. In S22 following S21, the category estimating section 14 determines whether it was possible to determine (estimate) the category. In a case where it was possible to determine (estimate) the category (YES in S22), the process proceeds to a process S23. In a case where it was impossible to determine (estimate) the category (NO in S22), the process proceeds to a step S24.

In S23, the scenario searching section 15 searches for a scenario with use of the category that has been estimated by the category estimating section 14. Thereafter, the process proceeds to S7 of FIG. 6. In S24, the scenario searching section 15 searches for a scenario while leaving, as it is, an unknown word that is contained in an input sentence. Thereafter, the process proceeds to S7 of FIG. 6. For example, in S24, the scenario searching section 15 can alternatively search for a scenario that is related to, for example, a category of an input sentence as a whole or a category of a word that is different from an unknown word that is contained in an input sentence.

[Flow of Process (From Related Name Search to Scenario Search)]

Figure 8:
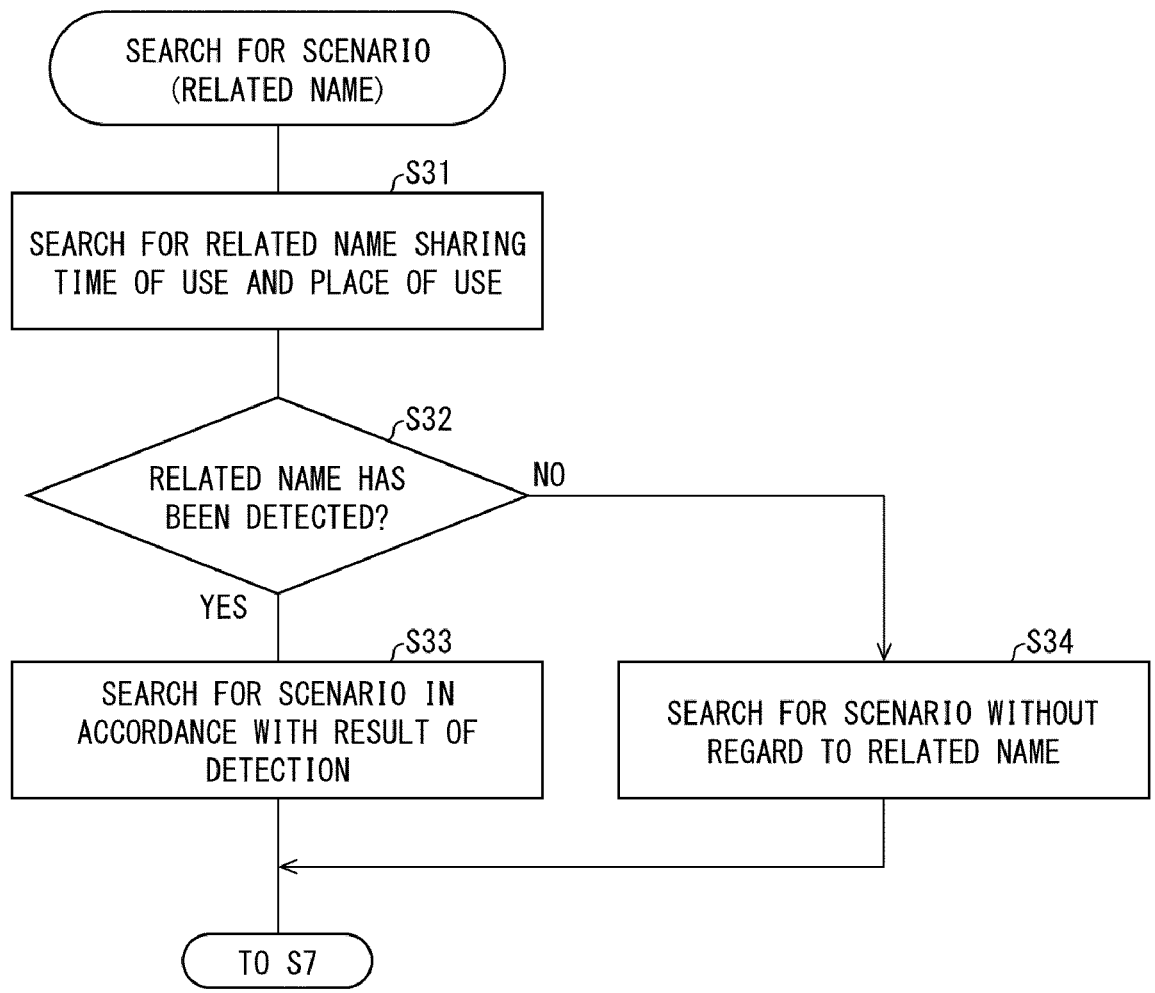
FIG. 8 is a flowchart showing an example of a process that the response device carries out so as to search for a scenario after searching for a related name.

The following description will specifically discuss the step S12 of FIG. 6 with reference to FIG. 8. FIG. 8 is a flowchart showing an example of a process that the response device 1 carries out so as to search for a scenario after searching for a related name.

In S31 (a detection step), the related term searching section 13 searches for a related name that shares a time of use and a place of use with a common noun for which the related term searching section 13 has determined in S11 that the result of morphological analysis includes the common noun. In S32 following S31, the related term searching section 13 determines whether the related name has been detected by the search. In a case where the related term searching section 13 determines in S32 that the related name has been detected (YES in S32), the process proceeds to a step S33. In a case where the related term searching section 13 determines in S32 that no related name has been detected (NO in S32), the process proceeds to a step S34.

In S33, the scenario searching section 15 searches for a scenario that is related to the related name detected. Thereafter, the process proceeds to S7 of FIG. 6. For example, in S33, the scenario searching section 15 can search for a scenario that is in accordance with at least one of (i) the result of morphological analysis, (ii) an input-output sentence that contains a morpheme of an input sentence, the input-output sentence being stored in, for example, the dialogue history DB 22, (iii) the related name, and (iv) an input-output sentence that contains the related name, the input-output sentence being stored in, for example, the dialogue history DB 22. Assume, for example, that the scenario DB 23 stores therein a scenario with which a condition that (i) an input sentence contains (a) a noun that refers to a person and (b) a word "day off" and (ii) an input-output sentence that contains a related name includes "<related name> likes <C>" (C belongs to a category "region") is associated. Assume also that a template for that scenario is "Let's go to <C> that <D> likes." (D is a noun that refers to a person that is contained in an input sentence). In a case where an input sentence "Mother will take a day off tomorrow." is inputted in this case, the scenario searching section 15 detects the above scenario. This causes the response sentence forming section 16 to form a response sentence "Let's go to <C> that Mother likes."

In S34, the scenario searching section 15 searches for a scenario without regard to the related name. Thereafter, the process proceeds to S7 of FIG. 6. For example, in S34, the scenario searching section 15 can alternatively search for a scenario that is in accordance with the result of morphological analysis and a past input-output sentence that is related to that result.

Embodiment 2

The description of Embodiment 1 has taken, as an example in which a response sentence is caused to have content that is related to a related term, an example in which a response sentence is formed with use of a scenario that has been detected by a category of a related term. Note, however, that a response sentence that is formed in a case where a related term has been detected is not limited to the example described earlier but can be any sentence whose content is related to the related term. For example, to an input sentence "Jonathan (unknown word) is sold.", a response sentence can contain a related term, e.g., a response sentence "Does Jonathan belong to the apple (related term) family?" can be formed. To the above input sentence, a response sentence in which an unknown word is replaced with a related term, e.g., "I love the apple (related term)," can alternatively be formed.

Similarly, the description of Embodiment 1 has taken, as an example in which a response sentence is caused to have content that is related to a related name, an example in which a response sentence that contains a word that is linked to "like" by "ga" (a Japanese particle) is formed in an input-output sentence that contains a related name serving as a subject. Note, however, that a response sentence that is formed in a case where a related name has been detected is not limited to the example described earlier but can be any sentence whose content is related to the related name. For example, to an input sentence "I saw Mother.", a response sentence can contain a related name, e.g., a response sentence "Does Mother refer to Sayuri?" can be formed.

Embodiment 1 has described an example in which a related name is searched for in a case where an input sentence contains a word that has another designation (a common noun that refers to a person is taken as a specific example). Note, however, that a related name can be searched for also in a case where an input sentence does not contain the above word but is a sentence which is related to that word. Assume, for example, that the scenario DR 23 contains the following scenario.
Input sentence condition: An input sentence contains "a word that refers to a time (timing)" and a word "day off".
Memory condition: "A word that refers to a family member", <mNode1>, and a word "like" are linked to each other.
Template: "Let's go to <mNode1>" that "a word that refers to a family member" likes.
Assume that the dialogue history DB 22 stores a link among "Sayuri", "hot spring", and "like" and an input sentence "Tomorrow will be a day off" has been inputted. That input sentence contains no common noun that refers to a person.

In the above example, though it is unclear whether "Sayuri" is "a word that refers to a family member", in a case where a related name that is related to "Sayuri" is detected by searching for a related name that is related to "Mother", which is "a word that refers to a family member", it is possible to regard "Sayuri" as "a word that refers to a family member". This makes it possible to form a response sentence "Let's go to a hot spring that Mother likes." to the above input sentence.

Embodiment 3

The response device 1 can also have a function different from a function of interacting with a user by voice. For example, the response device 1 can be a humanoid robot that has, for example, an unassisted walking function. The scope of a "response device" of the present disclosure also includes devices obtained by causing, for example, a mobile phone, a smartphone, a tablet terminal, a personal computer, household electrical appliances (e.g., a television, a refrigerator, an air conditioner, and a cleaner), and a car navigation device to each have the function (described earlier) of the response device 1. The "response device" of the present disclosure is preferably a device that a specific person such as a family member uses.

Embodiment 4

The function of the response device 1 of each of Embodiments 1 to 3 can also be carried out by a response system that includes a plurality of devices that are communicably connected via a communication network. The response system can be configured to include, for example, (i) a server (response device) that has a function corresponding to the morphological analysis section 12, the related term searching section 13, the category estimating section 14, the scenario searching section 15, the response sentence forming section 16, and the voice synthesizing section 17 and (ii) a voice input-output device that includes the voice input section 30 and the voice output section 40. According to the response system thus configured, the voice input-output device receives an input, by a user, of an input sentence and transmits that input sentence to the server. Then, the server forms a response sentence to the input sentence and transmits the response sentence to the voice input-output device, so that the response sentence is supplied from the voice input-output device. The response system can alternatively be configured such that the voice input-output device includes, for example, the voice recognizing section 11, the morphological analysis section 12, and the voice synthesizing section 17. The response system can alternatively be configured to include a plurality of servers in which the respective functional blocks described earlier are separately provided.

[Variation]

The descriptions of Embodiments 1 to 4 have taken an example in which, in a case where an input sentence contains a common noun that refers to a person, a related name which is related to that common noun is searched for. Note, however, that the "common noun that refers to a person" can be replaced with any "word that has another designation". For example, in a case where an input sentence contains a proper noun that refers to a person, it is possible to search for a related name which is related to that proper noun. This is because a proper noun that refers to a person frequently has another designation. Furthermore, for example, a name of an object and a name of a pet are also applicable instead of a name of a person. For example, in a case where (i) it can be inferred that a proper noun (name) that is contained in a certain conversation is an animal and (ii) that conversation has taken place around one's house, that proper noun can be considered to refer to a name of a pet. In this case, it is also possible to form (i) a response sentence in which a scenario that belongs to a category "pet" is used or a response sentence in which a dialogue history that is related to a pet is used. In contrast, in a case where that conversation has taken place at (i) a place that is away from the one's house or (ii) a zoo, that proper noun can be considered to merely refer to a name of an animal.

The dialogue history DB 22 can store various sentences other than (i) an input sentence that is supplied to the response device 1 and (ii) an output sentence that is supplied from the response device 1. For example, the dialogue history DB 22 can store (i) a sentence that has been retrieved from a book and (ii) a sentence that has been retrieved from various information sources (e.g., a news site) on the Internet. Note, however, that, in order that a response will have no generalized content, a sentence that is retrieved from a news site and a sentence that is retrieved from a book are each preferably limited to a sentence that refers to an objective fact (e.g., "A is B.").

[Software Implementation Example]

Control blocks of the response device 1 (particularly, the related term searching section 13, the category estimating section 14, the scenario searching section 15, and the response sentence forming section 16) can be realized by a logic circuit (hardware) provided in an integrated circuit (IC chip) or the like or can be alternatively realized by software as executed by a central processing unit (CPU).

In the latter case, the response device 1 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recap]

A response device of a first aspect of the present invention is a response device configured to form a response sentence to an input sentence, the response device including: a detection section configured to, in a case where the input sentence contains an unknown word, which is a word with which no given information that the response device uses to form the response sentence is associated, detect a related term, which is a known word that shares, with the unknown word, at least one shared word, which is a word that is used in an identical sentence; and a response sentence forming section configured to form the response sentence whose content is related to the related term that has been detected by the detection section.

According to the configuration, in a case where an input sentence contains an unknown word, a related term is detected, and a response sentence whose content is related to that related term is formed. Note here that, since a related term shares a shared word with an unknown word, the related term and the unknown word may be identical or similar in, for example, meaning and/or category. Since a related term is a known word, given information (e.g., word meaning and/or category) that is used to form a response sentence is also known. This brings about an effect of allowing a response sentence that is satisfactory to a user to be formed in consideration of, for example, a meaning and/or category of an unknown word that is contained in an input sentence.

In a second aspect of the present invention, a response device is configured such that, in the first aspect of the present invention, the detection section (i) detects, in a database that stores a combination of words with respect to a plurality of sentences, the at least one shared word that is combined with the unknown word and (ii) detects, in the database, that the known word that is combined with the at least one shared word is the related term.

Words that are used in combination with an identical shared word may be similar in, for example, meaning and/or category. Thus, the configuration makes it possible to form a response sentence that is related to, for example, a meaning and/or a category of an unknown word that is contained in an input sentence. Note that a sentence in which a combination, stored by the database, of words is contained is not limited to any particular sentence. For example, the database can store (i) a combination of words contained in a sentence that the response device received in the past (before receiving the input sentence) and (ii) a combination of words contained in a sentence that the response device outputted in the past. The database can also store a combination of words contained in the input sentence.

In a third aspect of the present invention, a response device can be configured such that, in the second aspect of the present invention, the detection section (i) detects a plurality of shared words that the at least one shared word comprises and (ii) detects that the known word that is combined with at least two of the plurality of shared words is the related term.

An unknown word and a known word that share more kinds of shared words are highly likely to be similar in, for example, meaning and/or category. Thus, the configuration makes it possible to more reliably form a response sentence that is related to, for example, a meaning and/or a category of an unknown word that is contained in an input sentence.

In a fourth aspect of the present invention, a response device can be configured, in any one of the first through third aspects of the present invention, to further include: a category estimating section configured to, in a case where it is impossible for the detection section to detect the related term, determine that a category of the at least one shared word, which is a word that is used in an identical sentence with the unknown word that is contained in the input sentence, is a category of the unknown word, the response sentence forming section forming the response sentence with use of a template that (i) is included in a plurality of templates that are stored in advance for each category and (ii) is associated with the category that has been determined by the category estimating section.

A shared word, which is a word that is used in an identical sentence with an unknown word and the unknown word may be identical in category. Thus, the configuration makes it possible to correctly determine a category of an unknown word and form a response sentence whose content is proper.

In a fifth aspect of the present invention, a response device can be configured, in any one of the first through third aspects of the present invention, to further include: a category estimating section configured to, in a case where it is impossible for the detection section to detect the related term, determine a category of the unknown word from a category of the output sentence that the response device has outputted immediately before receiving the input sentence, the response sentence forming section forming the response sentence with use of a template that (i) is included in a plurality of templates that are stored in advance for each category and (ii) is associated with the category that has been determined by the category estimating section.

Content of an output sentence and content of an input sentence immediately following the output sentence are ordinarily relevant to each other. This makes it possible to specify, in accordance with a category of an immediately preceding output sentence, a category of an input sentence following the immediately preceding output sentence. Furthermore, in a case where it is possible to specify a category of an input sentence, it may be possible to also specify a category of an unknown word that is contained in that input sentence. Thus, the configuration makes it possible to correctly determine a category of an unknown word and form a response sentence whose content is proper.

A response device of a sixth aspect of the present invention is a response device configured to form a response sentence to a sentence inputted by a user, the response device including: a detection section configured to, in at least one of a case where the input sentence contains a word that has another designation and a case where the input sentence is a sentence that is related to the word, detect a related designation, which is a designation that shares, with the word, shared word, which is a word that is used in an identical sentence; and a response sentence forming section configured to form the response sentence whose content is related to the related designation that has been detected by the detection section.

According to the configuration, in a case where an input sentence contains a word that has another designation, a related designation, which is a designation that shares a shared word with that word, is detected, and a response sentence whose content is related to that related designation is formed. Note here that a related designation, which is a designation that shares a shared word with the above word, may be another designation of that word. This brings about an effect of allowing a response sentence that is satisfactory to a user to be formed in consideration of another designation of a word that is contained in an input sentence.

In a seventh aspect of the present invention, a response device can be configured such that, in the sixth aspect of the present invention, the detection section detects, in a database that stores (i) a combination of words with respect to a plurality of sentences and (ii) at least one of (a) places at which the respective plurality of sentences were uttered and (b) time periods at which the respective plurality of sentences were uttered, the related designation that shares, with the input sentence, at least one of a place and a time period at each of which a sentence was uttered.

A related designation that is used in a sentence that shares, with an input sentence, at least one of a place and a time period at each of which a sentence was uttered is highly likely to be another designation of a word that is contained in the input sentence. Thus, the configuration makes it possible to detect a more reliable related designation. This makes it possible to more reliably form a response sentence that is satisfactory to a user.

A method of an eighth aspect of the present invention for controlling a response device is a method for controlling a response device configured to form a response sentence to an input sentence, the method including: a detection step of, in a case where the input sentence contains an unknown word, which is a word with which no given information that the response device uses to form the response sentence is associated, detect a related term, which is a known word that shares, with the unknown word, at least one shared word, which is a word that is used in an identical sentence; and a response sentence forming step of forming the response sentence whose content is related to the related term that has been detected by the detection step. The method brings about an effect similar to that brought about by the first aspect of the present invention.

A method of a ninth aspect of the present invention for controlling a response device is a method for controlling a response device configured to form a response sentence to an input sentence, the method including: a detection step of, in at least one of a case where the input sentence contains a word that has another designation and a case where the input sentence is a sentence that is related to the word, detect a related designation, which is a designation that shares, with the word, a shared word, which is a word that is used in an identical sentence; and a response sentence forming step of forming the response sentence whose content is related to the related designation that has been detected by the detection step. The method brings about an effect similar to that brought about by the fifth aspect of the present invention.

An response device in accordance with the foregoing aspects of the present invention may be realized by a computer. In this case, the present invention encompasses: a control program for the response device which program causes a computer to operate as the foregoing sections (software elements) of the response device so that the response device can be realized by the computer; and a computer-readable storage medium storing the control program therein.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Response device
13 Related term searching section (detection section)
14 Category estimating section
16 Response sentence forming section
22 Dialogue history database (DB)

The invention claimed is:

1. A response device configured to form a response sentence to an input sentence,
said response device comprising:
detection circuitry configured such that, in a case where the input sentence contains an unknown word and where at least one first shared word used in sentences with the unknown word and at least one second shared word used in other sentences with a known word are the same, the detection circuitry detects the known word as a related term, the unknown word being a word with which no given information that the response device uses to form the response sentence is associated, the known word being a word with which the given information is associated; and response sentence forming circuitry configured to form a response sentence whose content is related to the related term that has been detected by the detection circuitry.

2. The response device as set forth in claim 1, wherein the detection circuitry (i) detects, in a database that stores a combination of words with respect to a plurality of sentences, at least one first shared word that is combined with the unknown word and (ii) detects, in the database, that a known word that is combined with the at least one first shared word is the related term.

3. The response device as set forth in claim 2, wherein the at least one shared word comprises a plurality of first shared words, and wherein the detection circuitry (iii) detects the plurality of first shared words and (iv) detects that a known word that is combined with at least two of the plurality of first shared words is the related term.

4. The response device as set forth in claim 1, further comprising:

category estimating circuitry configured to, in a case where it is impossible for the detection circuitry to detect the related term, determine that a category of at least one first shared word, which is used in sentences with the unknown word that is contained in the input sentence, is a category of the unknown word, the response sentence forming circuitry forming a response sentence with use of a template that (i) is included in a plurality of templates that are stored in advance for each of a plurality of categories and (ii) is associated with the category that has been determined by the category estimating circuitry.

5. The response device as set forth in claim 1, further comprising:

category estimating circuitry configured to, in a case where it is impossible for the detection circuitry to detect the related term, determine a category of the unknown word from a category of an output sentence that the response device has outputted immediately before receiving the input sentence, the response sentence forming circuitry forming the response sentence with use of a template that (i) is included in a plurality of templates that are stored in advance for each of a plurality of categories and (ii) is associated with the category that has been determined by the category estimating circuitry.

6. A response device configured to form a response sentence to an input sentence, said response device comprising:

detection circuitry configured such that, in a case where (i) the input sentence contains a first designation word and (ii) at least one first shared word used in sentences with the first designation word and at least one second shared word used in other sentences which include a second designation word are the same, the detection circuitry detects the second designation word as a related designation; and response sentence forming circuitry configured to form a response sentence whose content is related to the related designation that has been detected by the detection circuitry.

7. The response device as set forth in claim 6, wherein the detection circuitry detects, in a database that stores (i) a combination of words with respect to a first plurality of sentences and (ii) at least one of (a) places at which the first plurality of sentences were uttered and (b) time periods at which the first plurality of sentences were uttered, a designation included in a sentence that shares, with the input sentence, at least one of a place and a time period at each of which a sentence was uttered.

8. A method for controlling a response device configured to form a response sentence to an input sentence, said method comprising:

a detection step of, in a case where the input sentence contains an unknown word and where at least one first shared word used in sentences with the unknown word and at least one second shared word used in other sentences with a known word are the same, detecting the known word as a related term, the unknown word being a word with which no given information that the response device uses to form the response sentence is associated, the known word being a word with which the given information is associated; and a response sentence forming step of forming a response sentence whose content is related to the related term that has been detected by the detection step.

9. A method for controlling a response device configured to form a response sentence to an input sentence, said method comprising:

a detection step of in a case where (i) the input sentence contains a first designation word and (ii) at least one first shared word used in sentences with the first designation word and at least one second shared word used in other sentences which include a second designation word are the same, detecting the second designation word as a related designation; and a response sentence forming step of forming a response sentence whose content is related to the related designation that has been detected by the detection step.

10. A non-transitory computer-readable recording medium in which a control program for causing a computer to function as a response device recited in claim 1 is stored, the control program causing the computer to function as each of the detection circuitry and the response sentence forming circuitry.

11. A non-transitory computer-readable recording medium in which a control program for causing a computer to function as a response device recited in claim 6 is stored, the control program causing the computer to function as each of the detection circuitry and the response sentence forming circuitry.

* * * * *